United States Patent
Husemoen et al.

(10) Patent No.: US 6,878,800 B2
(45) Date of Patent: *Apr. 12, 2005

(54) BINDER FOR MINERAL WOOL PRODUCTS

(75) Inventors: Thor Husemoen, Roskilde (DK); Erling Lennart Hansen, Gentofte (DK); Povl Nissen, Olstykke (DK)

(73) Assignee: Rockwool International A/S (DK)

( * ) Notice: Subject to any disclaimer, the term of this patent is extended or adjusted under 35 U.S.C. 154(b) by 0 days.

This patent is subject to a terminal disclaimer.

(21) Appl. No.: 10/332,208

(22) PCT Filed: Jul. 3, 2001

(86) PCT No.: PCT/EP01/07628

§ 371 (c)(1),
(2), (4) Date: Jun. 6, 2003

(87) PCT Pub. No.: WO02/06178

PCT Pub. Date: Jan. 24, 2002

(65) Prior Publication Data

US 2004/0024170 A1 Feb. 5, 2004

(30) Foreign Application Priority Data

Jul. 4, 2000 (EP) .......................................... 00202335

(51) Int. Cl.[7] ........................ C08G 69/26; C08G 69/08; C08K 3/40

(52) U.S. Cl. ....................... 528/332; 528/350; 528/353; 524/494; 524/514; 524/596; 524/600; 524/602; 524/606; 524/608

(58) Field of Search ................................. 528/332, 350, 528/353, 310, 312, 322, 335–336, 338–340; 524/494, 514, 596, 600, 602, 606, 608

(56) References Cited

U.S. PATENT DOCUMENTS

| | | | | |
|---|---|---|---|---|
| 3,341,573 A | * | 9/1967 | Shibe, Jr. | ..................... 560/170 |
| 4,074,988 A | * | 2/1978 | Eilerman et al. | ............. 65/448 |
| 4,978,738 A | * | 12/1990 | Mueller et al. | ............. 528/220 |
| 6,706,853 B1 | * | 3/2004 | Stanssens et al. | ........... 528/350 |
| 6,730,730 B1 | * | 5/2004 | Hansen et al. | ............. 524/494 |

FOREIGN PATENT DOCUMENTS

| | | | |
|---|---|---|---|
| EP | 0 354 361 A1 | * | 2/1990 |
| EP | 0 826 710 A2 | * | 3/1998 |
| WO | WO 99/36368 | * | 7/1999 |

* cited by examiner

*Primary Examiner*—P. Hampton Hightower
(74) *Attorney, Agent, or Firm*—Webb Ziesenheim Logdson Orkin & Hanson, P.C.

(57) ABSTRACT

Process for providing a binder for mineral fibers, comprising the steps of: mixing together under reactive conditions an amine and an anhydride whereby water is added thereto, once substantially all the anhydride is dissolved and/or reacted in the amine.

44 Claims, No Drawings

BINDER FOR MINERAL WOOL PRODUCTS

BACKGROUND OF THE INVENTION

1. Field of the Invention

The invention relates to a process for providing a binder for mineral fibers, i.e. man made vitreous fibers, for example glass, slag or stone wool, a binder obtainable via such a process, and a mineral wool product comprising such a binder.

2. Description of the Related Art

Mineral wool products generally comprise mineral fibers bonded together by a cured thermoset polymeric material. One or more streams of molten glass, slag or stone wool are drawn into fibers and blown into a forming chamber where they are deposited as a web on to a travelling conveyer. The fibers, while airborne in the forming chamber and while still hot are sprayed with a binder. The coated fibrous web is then transported from the chamber to a curing oven where heated air is blown through the mat to cure the binder and rigidly bond the mineral wool fibers together.

During the curing step when hot air is blown through the mat to cure the binder, a binder as disclosed in WO 99/36368 can be displaced within the mineral wool fibers, whereby a non-uniform distribution of the binder results, specifically wherein less binder is to be found at the bottom of the mineral fiber blocks (i.e. the side of the block where the hot air is blown into the product) than in the top thereof.

Also during curing, a large amount of the resin may be lost leading to undesirably high emissions and a high binder loss.

SUMMARY OF THE INVENTION

An object of the present invention is to improve on this situation.

According to a first aspect there is provided a process for providing a binder for mineral fibers, comprising the steps of mixing together under reaction conditions, an amine and an anhydride, whereby water is added thereto only after the anhydride has substantially dissolved in and/or reacted with the amine, and the reaction is thus terminated.

A second anhydride is preferably added to the reaction mixture whereby the water is preferably added to the reaction mixture immediately before or together with the second anhydride, or when substantially all of the second anhydride is dissolved in and/or reacted with the mixture of the first anhydride and the amine.

Water is most preferably added to the reaction mixture in an amount to make this easily pumpable.

Low viscous resin binders for mineral wool are known, wherein the usual procedure is to mix diethanolamine with water before adding any anhydride to minimize viscosity/stirring problems and to obtain the desired water solubility. These resins however contain a high amount of rest monomers, i.e. unreacted starting material, and have the disadvantages of providing a low molecular weight binder which has a long curing time. In order to overcome these extensive curing times, it is often necessary to use a high curing temperature with the accompanying problem that the high curing temperature and long curing time cause extensive evaporation of the binder and non-uniform binder distribution.

A binder so obtained, yields a high binder loss, high emission and curing problems.

By utilizing a process according to the present invention, a binder is provided for bonding mineral wool products, wherein the amount of rest monomers, i.e. unreacted start material is reduced, and having a higher average molecular weight, whilst still maintaining water solubility.

Furthermore, the inventors have shown that utilizing the process according to the present invention, the amount of emissions can be reduced, the binder yield can be raised, the curing time can be shortened, whilst the product quality can be improved.

It is theorized that the monomers also take part in the binder cross-linking reaction during curing, but if this amount is too high and the curing time is too long, most of the monomers evaporate.

The inventors have shown that providing the binder without water addition from the start of the reaction, reduces the amount of unreacted monomers and increases the curing speed yielding a binder having a higher average molecular weight.

Furthermore, the inventors have shown that the binder loss during curing is less because of the presence of less unreacted monomers, whereby a rapid viscosity increase is provided due to the shorter curing time and the higher initial Mw. This rapid viscosity increase makes it difficult for the monomers to evaporate from the reaction mixture instead having time to react as a binder component and take part in the cross-linking reaction. Furthermore, due to the increased viscosity of the binder obtainable by the process of the present invention, there is less displacement of the binder in the mineral wool, when the binder has been applied to the mineral wool and curing is taking place.

DETAILED DESCRIPTION OF THE PREFERRED EMBODIMENTS

In an embodiment, the amine is heated firstly to a temperature of at least 40, preferably at least 50 and most preferably to about 60° C. whereafter the first anhydride is added, and the reaction temperature then is raised to at least 70, preferably at least about 80 and most preferably to at least about 95° C. at which temperature the second anhydride can be added to the reaction mixture when substantially all the first anhydride has dissolved and/or reacted.

Alternatively increasing the reaction temperature from 90–95° C. to 100–200° C. gives a higher conversion of monomers to oligomers.

A preferred temperature range is 120–170° C., and most preferred is 130–150° C.

The temperature is at least 100°, often at least 120°, and preferably about 130° C. It is normally below 200°, and preferably below 170°, more preferably below about 150° C.

The average molecular weight of oligomers is increased when the reaction temperature is raised.

The evaporation loss of binder made of resin reacted at higher temperature is lower when cured.

A binder produced under these circumstances wherein water is added when the first anhydride has reacted, together with the second anhydride or at the end of the reaction, in an amount to make the binder easily pumpable, enables a binder with an increased average molecular weight to be provided but still having a desired pumpability, viscosity, and water dilutability.

A resin according to the present invention but made with water addition from the start has more than 50% unreacted monomers of diethanolamine and polycarboxylic acids (anhydrides reacted with water), less than 15% amide of complete amide formation and an average molecular weight of about 400 and a maximum of about 600.

A resin made according to the process of the present invention with water addition at the end, together with a second anhydride, or just before the second anhydride has been added, has less unreacted monomers, especially the polycarboxylic acids, less than 30% compared with water addition from the start, a higher amount of amides, 15% or more of complete amide formation, and an average molecular weight of 500–900 and a maximum of about 2000.

The second anhydride can be added to the reaction mixture when substantially all the first anhydride is dissolved. The first anhydride may be an aliphatic anhydride, such as tetrahydrophthalic anhydride, hexahydrophthalic anhydride, methyltetrahydrophthalic anhydride, succinic anhydride, nadic anhydride, maleic anhydride and glutaric anhydride. The second anhydride may be an aromatic anhydride such as phthalic anhydride, trimellitic anhydride, pyromellitic di-anhydride and methylphthalic anhydride. The amine maybe an N-substituted beta hydroxy alkylamine such as diethanolamine, 1-methyldiethanolamine, 1-ethyldiethanolamine, n-butyldiethanolamine, 1-methylisopropanolamine, 1-ethylisopropanolamine, 3-amino-1,2-propanediol, 2-amino-1,3-propanediol, and tris(hydroxymethyl)aminomethane, most preferably diethanolamine.

The reaction mixture used as a binder can also comprise an accelerator in order to accelerate curing speed, one or more resin additives such as siloxane to improve adhesion to fibre surface, thermal and UV stabilizers, surface active compounds, fillers such as clay, silicates, magnesium sulfate and pigments such as titanium oxide, hydrophobizing agents such as fluorine compounds, oils, preferably mineral and silicone oils and one or more corrosion inhibitors to curb the effect on pipes and the like, and/or a cross-linking agent. The accelerator may be the acid or corresponding salts of phosphorous acid, phosphoric acid, phosphonic acid, phosphinic acid (such as the form having Chemical Abstracts number 6303-12-5-83-PO2), citric acid, adipic acid, β-hydroxyalkylamides and corresponding salts thereof. The additives may be mono-, di- and polysaccharides, such as sucrose, glucose syrup, modified starch, starch, urea, dicyandiamide, polyglycols, acrylics, furfural, carboxymethyl cellulose, cellulose, polyvinyl alcohol, and melamin. The cross-linking agent may comprise a carboxylic acid group containing polymer; the polymer may be in the form of polyacrylic acids or polymethacrylic acids. The polycarboxylic acid cross-linking agents added to the reaction mixture may be present in the weight percentage range of 5–25%, particularly about 20 wt. %.

In this process, the mole ratio of the amine to the first anhydride may lie in the range of 1.0:0.1–2.0, preferably 1.0:0.5–1.5, and most preferably 1.0:0.5–1.0. For example the amine may be diethanolamine, the first anhydride may be tetrahydrophthalic anhydride, present in the mixture at a molar ratio of 1 to 0.5, and the second anhydride may be trimellitic anhydride or phthalic anhydride, present in the mixture at a lower mole ratio than the first anhydride, preferably being present in about half the amount of the first anhydride. After the addition of water to the reaction mixture, a base, such as $NH_3$, diethanolamine (DEA), triethanolamine (TEA), or alkali hydroxides, optionally mixed with a polyacrylic acid, preferably Acumer 1510 Rohm and Haas, MW about 60,000, may be subsequently added to adjust the pH of the reaction mixture up to about 8, preferably to a range of about 6 to about 8 and most preferably to about 7. An acid may be added to the reaction mixture, preferably before addition of the anhydride. The acid may be adipic acid, citric acid, trimellitic acid, sebacic acid, azelaic acid or succinic acid, preferably adipic acid. Polyacrylic acid may be added to the reaction mixture so that the weight percentage of the polyacrylic acid in the mixture lies in the range of up to 50%, for example 30%, preferably 25% and most preferably up to 20%. The process may also include adding a silane, preferably in the range of 0.1%–5%, more preferably 0.2%–3% and most preferably about 1% by weight of the resin reaction mixture, preferably by weight of the resin solids; the silane is most preferably prehydrolysed gamma-aminopropyltriethoxysilane (VS 142/Vitco).

The inventors have shown that the aged strength of the binder mixture can be improved by the addition of silane.

The amount of silane in the resin reaction mixture is at least 0.1%, often at least 0.2% and preferably at least about 1%. It is normally below 5% and preferably below 3% and is often about 1.5%.

In order to improve the water solubility of the binder a base might be added upto a pH of about 8, whereby a pH of between about 6–8 is preferred, more preferred being a pH of about 7. The base can be mixed with a polyacrylic acid and added to the resin after the resin reaction is stopped by water addition. The base thus need first be added after the resin is prepared. The base may be mixed with a carboxylic acid group containing polymer before addition. Suitable bases could be $NH_3$, DEA, TEA, or alkali hydroxides.

It is found that addition of one or more cross-linking agents with a carboxylic acid group containing polymer increases the curing speed of the binder.

The first and second anhydrides are chosen to provide reaction products with a large number of unreacted polycarboxylic acid groups, which is preferable for water solubility. A most preferred binder consists of 30% polymer of DEA (diethanolamine), THPA (tetrahydrophthalic anhydride) and TMA (trimellitic anhydride), 15% DEA monomer, 10% THPA monomer reacted with water to diacid, 5% TMA monomer reacted with water to triacid and 40% water. In the polymer preferably about 50% of the reacted DEA has reacted to an amide and the other 50% of the reacted DEA has reacted to an ester.

Another preferred binder consists of about 40% or more polymer, (DEA, THPA, TMA), about 10% or less DEA monomer, about 10% or less THPA monomer and TMA monomer reacted with water to diacid, triacid respectively and 40% water.

The invention will now be further clarified by way of the following examples and reference to table 1, wherein a plurality of resin formulations is shown.

Resin formulations were made (see tables 1, 2 and 3).
Key to Abbreviations in Tables DEA—diethanolamine
GLA—glutaric anhydride
SCA—succinic anhydride
TMA—trimellitic anhydride
ADP—adipic acid
THPA—tetrahydrophthalic anhydride
Base—ammonia, amines or inorganic hydroxides
PAA—polyacrylic acid
Silan—amino silanes as par example gamma-aminopropyltriethoxysilane (prehydrolysed VS 142 from Witco or not hydrolysed A 1100 from Witco or similar from other producers)
PTA—phthalic anhydride

TABLE 1

| Formulation | | Mol ratio | Water add. | Rest acid % | Rest amine % | Rest DEA % | Calculated amide % | Calculated ester % |
|---|---|---|---|---|---|---|---|---|
| 1 | DEA:THPA | 1:1.4 | from start | 52 | 91 | 46 | 9 | 45 |
| 2 | DEA:THPA | 1:1.4 | during reaction | 21 | 70 | 24 | 30 | 46 |
| 3 | DEA:THPA | 1:1.4 | at the end | 18 | 78 | 23 | 22 | 54 |
| 4 | DEA:THPA:TMA | 1:1:0.4 | from start | 73 | 90 | 66 | 10 | 24 |
| 5 | DEA:THPA:TMA | 1:0.8:0.6 | from start | 70 | 91 | 64 | 9 | 27 |
| 6 | DEA:THPA:TMA | 1:0.9:0.3 | before TMA | 31 | 82 | 50 | 18 | 32 |
| 7 | DEA:THPA:TMA | 1:0.8:0.3 | before TMA | 36 | 82 | 47 | 18 | 35 |
| 8 | DEA:THPA:TMA | 1:0.6:0.3 | before TMA | 26 | 85 | 63 | 15 | 23 |
| 9 | DEA:THPA:TMA | 1:0.6:0.3 | with TMA | 40 | 75 | 55 | 25 | 20 |
| 10 | DEA:THPA:PTA | 1:0.8:0.3 | from start | 77 | 86 | 68 | 14 | 18 |
| 11 | DEA:THPA:PTA | 1:0.6:0.8 | from start | 80 | 87 | 68 | 13 | 19 |
| 12 | DEA:THPA:PTA | 1:0.7:0.3 | at the end | 17 | 68 | 43 | 32 | 26 |
| 13 | DEA:THPA:PTA | 1:0.7:0.3 | at the end | 28 | 64 | 42 | 36 | 25 |
| 14 | DEA:GLA | 1:1.4 | at the end | 38 | 33 | 12 | 67 | 21 |
| 15 | DEA:SCA | 1:1.4 | at the end | 0 | 29 | 19 | 71 | 10 |
| 16 | DEA:THPA:SCA | 1:0.6:0.7 | at the end | 16 | 54 | 32 | 46 | 22 |

% Rest acid and % rest DEA are % rest monomers of added monomers. % Rest amine is amine not reacted to amide
% Calculated amide is difference between total amin and % rest amine. % Calculated ester is % DEA bound as ester

TABLE 2

| Formulation | Amine | Anhydride | Accelerator/ crosslinkers | Base | Silane (%) | Temp. [° C.] | Mole ratio | Water added | Rest acid | Rest DEA | Cal. amide % |
|---|---|---|---|---|---|---|---|---|---|---|---|
| 17 | DEA | THPA + TMA | phosphinic acid | NH$_4$OH | 0.4 | 130 | 1.0:0.6:0.3 | at the end | 18 | 39 | — |
| 18 | DEA | THPA + TMA | H$_3$PO$_4$ | NH$_4$OH | 0.4 | 130 | 1.0:0.6:0.3 | at the end | 18 | 39 | — |
| 19 | DEA | THPA + TMA | phosphinic acid + PAA | NH$_4$OH | 0.4 | 130 | 1.0:0.6:0.3 | at the end | 18 | 39 | — |
| 20 | DEA | THPA + TMA | PAA | NH$_4$OH | 0.4 | 130 | 1.0:0.6:0.3 | at the end | 18 | 39 | — |
| 21 | DEA | THPA + TMA | phosphinic acid | NH$_4$OH | 0.4 | 170 | 1:0.6:0.3 | at the end | 10 | 23 | — |

| Formulation | Cal. ester % | Average Mw | Amount added accelerator/ crosslinker in dry matter | Curing time, 250° C. [sec.] | Delaminating strength [kPa] | Remaining strength after ageing [kPa] | Binder yield [%] | Binder distribution [%] |
|---|---|---|---|---|---|---|---|---|
| 17 | — | 600 | 3% | 60 | 15.2 | 9.1 | 85 | Top-bottom is OK |
| 18 | — | 600 | 3% | 68 | | | 85 | Top-bottom is OK |
| 19 | — | 600 | 3% + 10% | 25 | | | 83 | Top-bottom is OK |

TABLE 2-continued

| | | | | | | | | |
|---|---|---|---|---|---|---|---|---|
| 20 | — | 600 | 10% | 28 | 11.2 | 4.5 | 84 | Top-bottom is OK |
| 21 | | not measured | 3% | | | | | |

TABLE 3

| Formulation | Amine | Polycarb. acid | Anhydride | Crosslinker | Base | Silane [%] | Temp. [° C.] | Mole ratio | Water added | Rest acid* | Rest amine | Rest DEA % |
|---|---|---|---|---|---|---|---|---|---|---|---|---|
| 22 | DEA | ADP | PTA + THPA | PAA | DEA | 0.2 | 130 | — | at the end | — | — | 39 |
| 23 | DEA | ADP | PTA + THPA | PAA | DEA | 0.2 | 130 | — | at the end | — | — | 37 |

| Formulation | Cal. amide [%] | Cal ester [%] | Average Mw | Amount added crosslinker | Curing time, 250° C. [sec.] | Delaminating strength [kPa] | Remaining strength after ageing [kPa] [%] | Binder Yield [%] | Binder distribution [%] |
|---|---|---|---|---|---|---|---|---|---|
| 22 | — | — | 600 | 20% | 20 | 13.4 | 3.6 28 | 59 | Less binder in bottom than in top |
| 23 | — | — | 600 | 20% | 20 | 12.1 | 4.0 35 | 67 | Less binder in bottom than in top |

*Not possible to analyse.

Formulation 22 and 23 were Prepared as Follows
Formulation 22
Resin 116 kg DEA was transferred to a 400 reactor and heated to 60° C. whilst stirring.

16.3 kg ADP was added, and the mixture heated and reacted at 130° C. for 60 minutes.

Thereafter cooled to 85° C. and 33.8 kg of THPA was added. Thereafter 82.5 kg PTA was added and the temperature raised to 130° C. for 120 minutes.

Subsequently the reaction mixture was cooled to 110° C. and 100 kg water added.

The temperature stabilised at approx. 50° C. The mixture was stirred for a further 15 minutes until homogenous.

The resin was cooled and transferred to a storage tank.

The resin solids content was determined as 62.2% at 200° C. Rest monomers: 39% of added DEA, 12% of added THPA, 25% of added PTA. Average molweight about 600.

The amount of rest monomers was determined by taking seperate samples of the resin for each component. The samples were heated to 200° C. in order to remove all water, and then measured.

Before use 4% DEA and 25% solids Acumer 1510 calculated on resin solids, 0.4% of sum solids silane and water to 25% solids content, was added.
Results of Trial Binder yield 60%
Delamination strength (EN 1607) 13.4 kPa (Terrænbatts Industri)—Aged 3.6 kPa (70° C./95%RH)
Tensile strength 5.5 kPa (Flexi A Batts)

Formulation 23
Resin 24 kg DEA was transferred to a 80 l reactor and heated to 60° C. and stirred.

6.7 kg ADP was added and the mixture heated and reacted at 130° C. for 60 minutes.

Thereafter cooled to 85° C. and 6.9 kg of THPA was added. Thereafter 16.9 kg PTA was added and the temperature raised to 130° C. for 120 minutes.

Subsequently the reaction mixture was cooled to 110° C. and 20.5 kg water added. The temperature stabilised at approx. 50° C.

The mixture was stirred for further 15 minutes until homogenous.

The resin was cooled and transferred to a storage tank.

The resin solids content of 63.4% was determined at 200° C. Rest monomers: 37% of added DEA, 14% of added THPA, 25% of added PTA. Average molweight about 600.

The amount of rest monomers was determined by taking out seperate samples of the resin for determination of each component. The samples were heated to 200° C. in order to remove all water, and then measured.

Before use 4% DEA and 25% solids Acumer 1510 calculated on resin solids, 0.4% of sum solids silane and water to 25% solids content, was added and analysed.
Results of Trial Binder yield 70%
Delamination strength (EN 1607) 12.1 kPa (Terrænbatts Industri)—Aged 4.3 kPa (70° C./95% RH)

A number of these formulations were investigated for molecular weight and curing time at 250° C., the results being as follows:
Molecular Weight Analysis of the Polymeric Part or Moiety
Formulation 1) DEA:THPA—water added from start—average Mw 400—maximum 600
3) DEA:THPA—water added at the end—average Mw 850—maximum 2000

4) DEA:THPA:TMA—water added from start—average Mw 400—maximum 600
5) DEA:THPA:TMA—water added from the start—average Mw 500—maximum 1500
9) DEA:THPA:TMA—water added with TMA—average Mw 500—maximum 1500

20.3 kg DEA is heated to 60° C., whereafter 17.7 kg THPA is added during stirring. The temperature is raised to 95° C. and reaction continued for 1 hour, whereafter 25.8 kg water and 11.2 kg TMA are added and right after 11.2 kg TMA is added. Temperature is held at 95° C. for ½ hour before the reaction is stopped by cooling to room temperature.

Composition of resin:
15% DEA monomer
10% THPA monomer reacted to acid
5% TMA monomer reacted to acid
40% Water
Rest 30% is polymer of DEA:THPA:TMA 16) DEA:THPA:SCA—water at the end—average Mw 550—maximum 1100
Curing Time at 250° C.

DEA:THPA:TMA or PTA—curing time about 2 minutes, formulation 9) and 12), table 1;
DEA:THPA:SCA—curing time about 1 minute, formulation 16), table 1;
DEA:THPA:TMA or PTA added 20% polyacrylic acid—curing time 25–40 seconds, formulation 9) and 12), table 1;
DEA:THPA:SCA added 20% polyacrylic acid—curing time 20 seconds, formulation 16), table 1.

The curing time was measured by preheating a droplet of binder placed on a thin glass plate during 45 minutes at 90° C. after which it was heated to 250° C. by placing the glass plate on a heating plate and stirred with a thin needle. The time until the binder droplet was cured was measured after placing on said heating plate. The test method was repeated. Two more droplets of the same binder were tested using the same method.

Factory trials utilizing the binder according to the present invention on a mineral wool Marine Slab 100 was carried out as follows.

Binder formulations were made based on selected resins to which 20% w/w polyacrylic acid was added as a cross-linking agent and 0.2% w/w silane as a coupling agent was added. Curing was carried out at 250° C.

The delaminating strength was measured according to EN 1607, whereby ageing is defined as remaining delaminating strength after treatment 15 minutes in an autoclave with 120° C. (1 ato).
Results Formulation 16, DEA:THPA:SCA—water at the end.
Delamination strength 9 kPa—remaining strength after ageing 25%—binder yield 75%
Binder distribution top—bottom is OK
Formulation 9, DEA:THPA:TMA—water added during TMA addition.
Delaminating strength 10 kPa—remaining strength after ageing 68%—binder yield 80%
Binder distribution top—bottom is OK
Formulation 13, DEA:THPA:PTA—water at the end.
Delaminating strength 10 kPa—remaining strength after ageing 52%—binder yield 65%
Less binder in bottom than top
Reference formulation 1 DEA:THPA—water added from start.
Delamination strength 7 kPa—remaining strength after ageing 40%—binder yield <50%
Almost no binder in the ⅓ bottom part which is cut away before delamination measurements.

EXAMPLE

Reaction Temperature at 130° C. Compared with 95° C. (See Table 2)

Formulation 9) Reaction Temperature 95° C.
Molratio DEA:THPA:TMA=1:0.6:0.3, coupling agent 0.4% VS 142 of binder solids.
Rest monomers: 55% of added DEA, rest monomers 40% of added anhydrides.
Average molecular weight of oligomers 500.
Evaporation loss of binder solids in factory trial 25–30%
Product quality:
  Delamination strength (EN 1607) 10 kPa, remaining strength after ageing 6.8 kPa
Product quality when using phosphonic acid as curing accelerator
  Delaminating strength (EN 1607) 12.9 kPa, remaining strength after ageing 7.6 kPa.
Formulations 17–20 reaction temperature 130° C.
Molratio as formulation 9) DEA:THPA:TMA=1:0.6:0.3 90 kg DEA was heated to 60° C. whereafter 40 kg THPA was added during stirring. The temperature was raised to 95° C. whereafter the exothermic reaction continued to raise the temperature to 115° C. A Further 38.5 kg THPA was added and the temperature allowed to rise to 130° C. and maintained for 10 minutes before 49.6 kg TMA was added. The temperature was held at 130° C. for 60 minutes and then cooled to approximately 50° C. by the addition of 120 l of water. The reaction mixture was kept at this temperature for 60 minutes until all TMA was dissolved.
Rest monomers: 39% DEA of added, rest monomer 18% of added anhydrides.
Average molecular weight of oligomers 600.
Before further dilution with water a base is added until a pH of about 6–8, preferably 7 results. The base may be an alkalihydroxide, amine or ammoniumhydroxide.
In these formulations ammoniumhydroxide was used.
  Evaporation loss of binder solids was between 15 and 17%.
  Before use an accelerator/crosslinker, a silane and water was added to 25% solids content.
Product quality when using 3% of solids phosphonic acid as curing accelerator (formulation 17)
  Delaminating strength (EN 1607) 15.2 kPa, remaining strength after ageing 9.1 kPa.
Product quality when using PAA as curing agent (Rohm and Haas Acumer 1510), (formulation 20).
  Delamination strength (EN 1607) 11.2 kPa, remaining strength after ageing 4.5 kPa.
High silane addition as described in the example above.
Silane Results
The binder mixture in formulation 17 was used for testing different amounts of silane addition.
The binding strength was performed according to the grit bar test.
Preparation and Testing of Selected Binder Samples to Evaluate the Binding Strength Towards Shots with Mineral Fibre Composition (Grit Bar Test)

Shots with size between 0.25 and 0.5 mm diameter were used to make bars with dimensions 140 mm×25 mm×10 mm.

For making the bars 90 ml binder solution with 15% solids content and from 0.2%–3.0% silane coupling agent of binder solids were mixed with 450 g shots.

The coupling agent was gamma-aminopropyltriethoxysilane.

To some of the binder solutions were added $NaH_2PO_2$—$H_2O$ (3% of binder solids) as curing accelerator.

Out of the 450 g shots mixed with binder solution can be made 8 bars which is cured 2 hours at 200° C. in an incubator.

Four of the bars were broken directly (dry strength), the other 4 are placed 3 hours in 80° C. water before they are broken (wet strength).

The binding strength was determined by breaking the bars in a measuring device, where the clamping length is 100 mm and the velocity of the compressing beam was 10 mm/min. Using the clamping length, width and thickness of the bars, the bending strength was determined in $N/mm^2$.

Grit Bar Test Results

| Bending strength | Dry $N/mm^2$ | Wet $N/mm^2$ |
|---|---|---|
| 0.2% silane | 9 | 4 |
| 0.4% silane | 9 | 4 |
| 0.6% silane | 9 | 5 |
| 1.0% silane | 9 | 7 |
| 1.2% silane | 9 | 8 |
| 3.0% silane | 9 | 8 |

A resin made according to formulation 22 with a mole ratio DEA:ADP=1:0.5, reaction temperature 130° C. was mixed with 25% Acumer 1510 solids of resin solids and further added different amounts of silane VS 142.

Grit Bar Tests Show

| Bending strength | Dry $N/mm^2$ | Wet $N/mm^2$ |
|---|---|---|
| 0.2% silane | 9 | 3 |
| 0.4% silane | 9 | 3.5 |
| 0.6% silane | 9 | 5 |
| 1.0% silane | 9 | 7 |
| 1.2% silane | 9 | 8 |
| 3.0% silane | 9 | 8 |

The aged (wet) strength is improved by adding higher amounts of silane. (Silan VS 142 as a % of the sum solids)

Conclusions Based on Results

Water addition at the end yielded less unreacted starting monomers, whereby water addition at the end or together with the second anhydride gives higher yield of amides in the resin. See table 1.

SCA as second anhydride yielded short curing time and high yield of amides in the reaction product.

When the amount amides in the reaction product is too high (>40% of the DEA added) the delamination strength after ageing of the mineral wool products proved to be poor.

The preferable mol.ratio DEA to anhydride proved to be 1:0.9–1.2, whereby higher ratios of anhydrides may provide less water soluble resin.

Water should be added at the end, immediately before, or together with the second anhydride.

The first anhydride is preferably THPA, mol.ratio 0.5 to 1 related to DEA.

The preferred second anhydride is TMA or PTA.

SCA as second anhydride yielded good strength before ageing, but poor ageing stability.

An example of a preferred resin consists of 30% polymer of DEA, THPA and TMA, 15% DEA monomer, 10% THPA monomer reacted with water to diacid, 5% TMA monomer reacted with water to triacid 40% water.

An example of another preferable resin consists of about 40% or more polymer of DEA, THPA and TMA, about 10% or less DEA monomer, about 10% or less THPA monomer and TMA monomer reacted with water to diacid, triacid respectively and about 40% water.

In the polymer about 50% of the DEA which has reacted to a polymer is preferably an amide and the other 50% has preferably reacted to an ester.

The invention is not limited to the above description but is rather determined by the following claims.

What is claimed is:

1. A process for providing a binder for mineral fibers, comprising the steps of:

mixing together under reactive conditions an amine and an anhydride whereby water is added thereto, once substantially all the anhydride is dissolved in and/or reacted with the amine.

2. The process according to claim 1, wherein a second anhydride is added to the reaction mixture.

3. The process according to claim 1, wherein the water is added to the reaction mixture when the first anhydride has reacted, immediately before or together with the second anhydride, or when substantially all the second anhydride is dissolved in the mixture of the first anhydride and the amine.

4. The process according to claim 1, wherein water is added in an amount to make the reaction mixture easily pumpable at room temperature.

5. The process according to claim 1, wherein the amine is heated firstly to a temperature of at least 40° C., whereafter the first anhydride is added, and the reaction temperature raised to at least about 70° C.

6. The process according to claim 5, wherein the reaction temperature is raised to at least about 90° C., and is below about 200° C.

7. The process according to claim 5, wherein the second anhydride is added to the reaction mixture when substantially all the first anhydride is dissolved.

8. The process according to claim 1, wherein the first anhydride is an aliphatic anhydride.

9. The process according to claim 2, wherein the second anhydride is an aromatic anhydride.

10. The process according to claim 1, wherein the first aliphatic anhydride is selected from the group consisting of tetrahydrophthalic anhydride, and/or hexahydrophthalic anhydride, methyltetrahydrophthalic anhydride, succinic anhydride, nadic anhydride, maleic anhydride, and glutaric anhydride.

11. The process according to claim 2, wherein the second aromatic anhydride is selected from the group consisting of phthalic anhydride, trimellitic anhydride, pyromellitic di-anhydride and methylphthalic anhydride.

12. The proccas according to claim 1, wherein the amine is selected from the group consisting of diethanolamine, 1-methyldiethanolamine, 1-ethyldiethanolamine, n-butyldiethanolamine, 1-methylisopropanolamine, 1-ethylisopropanolamine, 3-amino-1,2-propanediol, 2-amino-1,3-propanediol, and tris(hydroxymethyl) aminomethane.

13. The process according to claim 1, comprising the further step of addition of at least one of the following additives: an accelerator in order to accelerate curing speed and one or more resin additives to improve adhesion to fibre surface, thermal and UV stabilizers, surface active compounds, fillers, silicates, magnesium sulfate and pigments, hydrophobizing agents, oils, and corrosion inhibitors.

14. The process according to claim 13, wherein the accelerator is selected from the group consisting of phosphorous acid, phosphoric acid, phosphonic acid, phosphinic acid, citric acid, adipic acid, β-hydroxyalkylamides and corresponding salts thereof.

15. The process according to claim 14, wherein the phosphinic acid is the accelerator.

16. The process according to claim 13, wherein the additives are selected from the group consisting of sucrose, glucose syrup, modified starch, starch, urea, dicyandiamide, polyglycols, acrylics, furfural, carboxymethyl cellulose, cellulose, polyvinyl alcohol and melamin.

17. The process according to claim 1, further comprising adding cross-linking agent.

18. The process according to claim 17, wherein the cross-linking agent comprises a carboxylic acid group containing polymer, and the polycarboxylic acid cross-linking agent is present in the reaction mixture in the weight percentage range of 5–25%.

19. The process according to claim 1, further comprising addition of corrosion inhibitors.

20. The process according to claim 1, wherein the mole ratio of the amine to the first anhydride lies in the range of 1.0:0.1–2.0.

21. The process according to claim 20, wherein the amine is diethanolamine, and wherein the first anhydride is tetrahydrophthalic anhydride, and wherein the amine and the first anhydride are present in the mixture at a molar ratio of 1 to 0.5, respectively.

22. The process according to claim 21, wherein the second anhydride is one of trimellitic anhydride and phthalic anhydride, and wherein the second anhydride is present in the mixture at a lower mole ratio than the first anhydride.

23. The process according to claim 1, wherein a base is subsequently added to the reaction mixture, following the water addition.

24. The process according to claim 23, wherein the base is selected from the group consisting of $NH_3$, diethanolamine (DEA), triethanolamin (TEA), alkalihydroxides, optionally mixed with a polyacrylic acid.

25. The process according to claim 23, wherein the base in the resin reaction mixture adjusts the pH up to about 8.

26. The process according to claim 1, further comprising adding before addition of the anhydride, an acid selected from the group consisting of adipic acid, citric acid, trimellitic acid, sebacic acid, azelaic acid and succinic acid.

27. The process according to claim 23, further comprising adding polyacrylic acid, wherein the weight % of the polyacrylic acid in the mixture lies in the range up to 50%.

28. The process according to claim 1, further comprising the step of adding a silane, in the range of 0.1%–5% by weight of the resin solids.

29. A binder for mineral fibers, obtained according to the process of claim 1.

30. A binder comprising the reaction product of an amine, a first anhydride, a second anhydride and water and the polymeric part of the binder having a molecular weight of a maximum of about 2000.

31. The binder according to claim 30, wherein the first anhydride is an aliphatic anhydride and the second anhydride is an aromatic anhydride.

32. The binder according to claim 30, wherein the amine is selected from the group consisting of diethanolamine, 1-methyldiethanolamine, 1-ethyldiethanolamine, n-butyldiethanolamine, 1-methylisopropanolamine, 1-ethylisopropanolamine, 3-amino-1,2-propanediol, 2-amino-1,3-propanediol, and tris(hydroxymethyl) aminomethane.

33. The binder according to claim 30, further comprising a binder additive comprising at least one of an accelerator, a resin additive improving adhesion to fiber surfaces, a thermal stabilizer, a UV stabilizer, a surface active compound, a filler, a silicate, magnesium sulfate, a pigment, a hydrophobizing agent, an oil, and a corrosion inhibitor.

34. The binder according to claim 29, having a curing time at 250° C. of at the most about 2 minutes.

35. A method of reducing emissions and improving the average molecular weight of a binder for mineral fibers, comprising an amine, a first aliphatic anhydride and a second aromatic anhydride, comprising adding water to the reaction mixture once the first anhydride is dissolved in the amine.

36. The process according to claim 1, wherein the amine is an N-substituted beta hydroxyalkylamine, wherein the amine is firstly heated to a temperature of at least 50° C., whereafter the first anhydride is added, and the reaction temperature is raised to at least about 90° C. and is below 200° C., comprising the further step of:

adding at least one of aminosiloxane clay fillers, titanium oxide pigment, fluorine compound hydrophobizing agents, mineral oils, silicone oils, monosaccharides, disaccharides, polysaccharides, polyacrylic acid cross-linking agent, polymethacrylic acid cross-linking agent, wherein the mole ratio of the amine to the first anhydride lies in the range of 1.0:0.5–1.5;

wherein a base, mixed with a polyacrylic acid with a molecular weight of about 60,000 is subsequently added to the reaction mixture, following the water addition;

wherein the base in the resin reaction mixture adjusts the pH to lie in a range of about 6 to about 8; and further comprising the step of adding a silane in the range 0.2%–3% by weight of the resin reaction mixture.

37. The process according to claim 1, wherein the amine is firstly heated to a temperature of at least 60° C., whereafter the first anhydride is added, and the reaction temperature is raised to at least about 95° C. and is below 170° C., wherein the mole ratio of the amine to the first anhydride lies in the range of 1.0:0.5–1.0, wherein a base is subsequently added to the reaction mixture, following the water addition, wherein the base in the resin reaction mixture adjusts the pH to about 7, and further comprising the step of adding a silane in the amount of about 1% by weight of the resin reaction mixture.

38. The process according to claim 1, wherein the amine is firstly heated to a temperature of at least 50° C., whereafter the first anhydride is added, and the reaction temperature is raised to at least about 100° C. and is below 150° C., further comprising adding a cross-linking agent to the reaction mixture to be present in die reaction mixture in the amount of about 20% by weight, and further comprising the step of adding prehydrolysed gamma-aminopropyltriethoxysilane in the range of 0.2–3% by weight of the resin solids.

39. The process according to claim 1, wherein the amine is firstly heated to a temperature of at least 50° C., where after the first anhydride is added, and the reaction temperature is raised to at least about 120° C., and further comprising the step of adding prehydrolysed gamma-aminopropyltriethoxysilane in the amount of about 1% weight of the resin reaction mixture.

40. The process according to claim 1, wherein the amine is firstly heated to a temperature of at least 50° C., and whereafter the first anhydride is added, and the reaction temperature is raised to at least about 130° C.

41. The process according to claim 1, wherein the amine is firstly heated to a temperature of at least 50° C., and whereafter the first anhydride is added, and the reaction temperature is raised to at least about 150° C.

42. The binder according to claim 30, wherein the polymeric part of the binder has an average molecular weight lying in the range of 300–1500, and having a curing time at 250° C. lying in the range of 15–55 seconds.

43. The binder according to claim 30, wherein the polymeric part of the binder has an average molecular weight lying in the range of 400–1000, and having a curing time at 250° C. lying in the range of 20–40 seconds.

44. The binder according to claim 30, wherein the polymeric part of the binder has an average molecular weight lying in the range of 500–900.

* * * * *

UNITED STATES PATENT AND TRADEMARK OFFICE
CERTIFICATE OF CORRECTION

PATENT NO. : 6,878,800 B2
APPLICATION NO. : 10/332208
DATED : April 12, 2005
INVENTOR(S) : Husemoen et al.

It is certified that error appears in the above-identified patent and that said Letters Patent is hereby corrected as shown below:

Column 12, line 59, Claim 12, "The proccas according to" should read --The process according to --

Column 13, line 45, Claim 24, "triethanolamin TEA" should read -- triethanolamine TEA --

Column 14, line 61, Claim 38, "present in die reaction" should read -- present in the reaction --

Column 15, line 4-5, Claim 39, "1% weight" should read -- 1% by weight --

Signed and Sealed this

Twenty-third Day of October, 2007

JON W. DUDAS
*Director of the United States Patent and Trademark Office*